US012756080B2

(12) United States Patent
Kondo et al.

(10) Patent No.: US 12,756,080 B2
(45) Date of Patent: Oct. 6, 2026

(54) WAVEGUIDE ELEMENT OPERABLE UP TO TERAHERTZ FREQUENCIES INCLUDING A DIELECTRIC PORTION HAVING PERIODIC HOLES OF A SPECIFIED PERIOD FORMED THEREIN AND WHICH IS MOUNTED ON A SUPPORT SUBSTRATE

(71) Applicant: NGK INSULATORS, LTD., Nagoya-City (JP)

(72) Inventors: Jungo Kondo, Miyoshi (JP); Kentaro Tani, Nagoya (JP); Keiichiro Asai, Nagoya (JP); Naotake Okada, Anjo (JP)

(73) Assignee: NGK INSULATORS, LTD., Nagoya-City (JP)

( * ) Notice: Subject to any disclaimer, the term of this patent is extended or adjusted under 35 U.S.C. 154(b) by 266 days.

(21) Appl. No.: 18/461,663

(22) Filed: Sep. 6, 2023

(65) Prior Publication Data

US 2023/0411818 A1 Dec. 21, 2023

Related U.S. Application Data

(63) Continuation of application No. PCT/JP2022/002667, filed on Jan. 25, 2022.

(30) Foreign Application Priority Data

Mar. 29, 2021 (JP) ................................ 2021-054524

(51) Int. Cl.

*H01P 1/20* (2006.01)
*H01P 3/12* (2006.01)
*H01P 3/16* (2006.01)

(52) U.S. Cl.

CPC ............ *H01P 1/2005* (2013.01); *H01P 3/121* (2013.01); *H01P 3/165* (2013.01)

(58) Field of Classification Search

CPC ......... H01P 3/121; H01P 3/165; H01P 1/2005

(Continued)

(56) References Cited

U.S. PATENT DOCUMENTS 6,104,264 A * 8/2000 Ishikawa et al. ....... H01P 3/165 333/248
6,643,439 B2 11/2003 Notomi et al.
(Continued)

FOREIGN PATENT DOCUMENTS

JP 2002-350657 A 12/2002
JP 2003-227953 A 8/2003
(Continued)

OTHER PUBLICATIONS

International Search Report and Written Opinion (Application No. PCT/JP2022/002667) dated Mar. 29, 2022 (12 pages).
(Continued)

*Primary Examiner* — Benny T Lee
(74) *Attorney, Agent, or Firm* — Muncy, Geissler, Olds & Lowe, P.C.

(57) ABSTRACT

The waveguide element includes: a dielectric portion having holes periodically formed in a substrate made of a ceramics material; a low-dielectric constant portion having a dielectric constant smaller than a dielectric constant of the dielectric portion; and a support substrate arranged below the dielectric portion, the support substrate being configured to support the dielectric portion. The waveguide element is configured to guide an electromagnetic wave having a frequency of 30 GHz or more and 20 THz or less, and a frequency range of the electromagnetic wave in which an absolute value of a propagation loss becomes 1 dB/cm or less is 50 GHz or more.

9 Claims, 8 Drawing Sheets

(58) Field of Classification Search
USPC .......................................................... 333/248
See application file for complete search history.

(56) References Cited

U.S. PATENT DOCUMENTS

| | | | | |
|---|---|---|---|---|
| 7,242,839 | B2 | 7/2007 | Sakai et al. | |
| 8,002,998 | B2 | 8/2011 | Iwata et al. | |
| 8,705,920 | B2 | 4/2014 | Tokushima | |
| 9,496,622 | B2 | 11/2016 | Fujita et al. | |
| 9,632,247 | B2 | 4/2017 | Fujita et al. | |
| 2005/0237137 | A1 * | 10/2005 | Dutta ...................... | H01P 3/085 333/246 |
| 2006/0083472 | A1 | 4/2006 | Sakai et al. | |
| 2008/0047928 | A1 | 2/2008 | Iwata et al. | |
| 2011/0293217 | A1 | 12/2011 | Tokushima | |
| 2015/0241630 | A1 | 8/2015 | Fujita et al. | |
| 2016/0178843 | A1 | 6/2016 | Fujita et al. | |
| 2020/0251799 | A1 * | 8/2020 | Vosoogh et al. ...... | H01P 11/002 |

FOREIGN PATENT DOCUMENTS

| | | | |
|---|---|---|---|
| JP | 2005-274840 | A | 10/2005 |
| JP | 2007-047604 | A | 2/2007 |
| JP | 2008-052108 | A | 3/2008 |
| JP | 2015-162787 | A | 9/2015 |
| JP | 2015-187716 | A | 10/2015 |
| JP | 6281868 | B2 | 2/2018 |
| JP | 2019-050537 | | 3/2019 |
| WO | 2010/073708 | A1 | 7/2010 |

OTHER PUBLICATIONS

English translation of the International Preliminary Report on Patentability (Chapter I) dated Oct. 12, 2023 (Application No. PCT/JP2022/002667).

Gao, Weijie et al., "*Effective-Medium-Cladded Dielectric Waveguides for Terahertz Waves,*" Optics Express, 2019, vol. 27, No. 26, pp. 38721-38734 (14 pages).

German Office Action (with English translation) dated Aug. 27, 2025 (Application No. 11 2022 000 898.9).

Weijie Gao, et al., "Evolution from Air-Cladded to Effective-Medium-Claded Dielectric Waveguides," 2019 44$^{th}$ International Conference on Infrared, Millimeter and Terahertz Waves (IRMMW-THz), Sep. 1, 2019-Sep. 6, 2019, Paris, France.

Chinese Office Action for Chinese Application No. 202280015795.6 dated Mar. 20, 2026.

Feng Xu and Ke Wu, "Substrate Integrated Nonradiative Dielectric Waveguide Structures Directly Fabricated on Printed Circuit Boards and Metallized Dielectric Layers," *IEEE Transactions on Microwave Theory and Techniques*, vol. 59, No. 12, Dec. 2011, pp. 3076-3086.

Chinese Office Action for Chinese Application No. 202280015795.6 dated Aug. 8, 2026.

* cited by examiner

WAVEGUIDE ELEMENT OPERABLE UP TO TERAHERTZ FREQUENCIES INCLUDING A DIELECTRIC PORTION HAVING PERIODIC HOLES OF A SPECIFIED PERIOD FORMED THEREIN AND WHICH IS MOUNTED ON A SUPPORT SUBSTRATE

CROSS-REFERENCE TO RELATED APPLICATIONS

This application is a continuation under 35 U.S.C. 120 of International Application PCT/JP2022/002667 having the International Filing Date of 25 Jan. 2022 and having the benefit of the earlier filing date of Japanese Application No. 2021-054524, filed on 29 Mar. 2021. Each of the identified applications is fully incorporated herein by reference.

BACKGROUND OF THE INVENTION

1. Field of the Invention

The present invention relates to a waveguide element.

2. Description of Related Art

There have been advances in the development of a waveguide element serving as one electro-optical element. The applications and development of the waveguide element in a wide variety of fields including an optical waveguide, next-generation high-speed communication, a sensor, laser processing, and photovoltaic power generation have been expected. For example, there have been advances in the development of a waveguide element as a waveguide for waves ranging from a millimeter wave to a terahertz wave, the waveguide serving as a key to the next-generation high-speed communication. A technology including using a two-dimensional photonic crystal slab formed of a semiconductor material has been proposed as an example of such waveguide element (Patent Literature 1). However, such waveguide element has the following problems: the delay of an electric signal is large; the frequency range of an electromagnetic wave to be propagated therein is narrow (a wideband waveguide element is difficult to achieve); and a production method therefor is complicated and costly because a semiconductor process is used for forming a photonic crystal.

CITATION LIST

Patent Literature

[PTL 1] JP 6281868 B2 published Feb. 21, 2018.

SUMMARY OF THE INVENTION

A primary object of the present invention is to provide a waveguide element, which shows small delay of an electric signal, shows a small propagation loss over a wide frequency range, and can be produced simply and inexpensively.

According to one embodiment of the present invention, there is provided a waveguide element, including: a dielectric portion having holes periodically formed in a substrate made of a ceramics material; a low-dielectric constant portion having a dielectric constant smaller than a dielectric constant of the dielectric portion; and a support substrate arranged below the dielectric portion, the support substrate being configured to support the dielectric portion. The waveguide element is configured to guide an electromagnetic wave having a frequency of 30 GHz or more and 20 THz or less, and a frequency range of the electromagnetic wave in which an absolute value of a propagation loss becomes 1 dB/cm or less is 50 GHz or more.

In one embodiment, a period P of the holes is 50 μm or more, and the period has a variation of P/100 or more.

In one embodiment, the holes each have a diameter "d" of P/100 or more.

In one embodiment, the waveguide element has a normalized frequency $P/\lambda$ of from 0.05 to 0.3 where A represents a wavelength of the electromagnetic wave.

In one embodiment, the ceramics material is polycrystalline or amorphous.

In one embodiment, the ceramics material is selected from quartz glass, aluminum nitride, aluminum oxide, silicon carbide, magnesium oxide, and spinel.

In one embodiment, the waveguide element further includes a joining portion configured to integrate the dielectric portion and the support substrate with each other, a lower surface of the dielectric portion, an upper surface of the support substrate, and the joining portion define a cavity, and the cavity functions as the low-dielectric constant portion.

In one embodiment, the waveguide element further includes an active element capable of at least one of transmission, reception, or amplification of the electromagnetic wave, the active element being supported by the support substrate.

In one embodiment, the waveguide element further includes: a line-defect first waveguide defined in a portion in the substrate where the holes are free from being formed; and a second waveguide positioned between the active element and the first waveguide in a propagation path of the electromagnetic wave, the second waveguide being capable of guiding the electromagnetic wave.

In one embodiment, the waveguide element further includes: a line-defect waveguide defined in a portion in the substrate where the holes are free from being formed; and a resonator defined in the portion in the substrate where the holes are free from being formed, the resonator being positioned between the active element and the waveguide in a propagation path of the electromagnetic wave, and being capable of guiding the electromagnetic wave.

Advantageous Effects of the Invention

According to the embodiment of the present invention, the waveguide element, which shows small delay of an electric signal and shows a small propagation loss over a wide frequency range (i.e., is a wideband element), can be achieved by forming, in the substrate made of the ceramics material, the hole pattern in which no photonic band gap is formed. Further, the hole period of the waveguide element is sufficiently small as compared to the wavelength of the electromagnetic wave so that no diffraction effect may occur. However, the use of the ceramics material having a dielectric constant smaller than that of a semiconductor eliminates the need for the formation of a precise hole pattern by a semiconductor process, and the adoption of the hole pattern in which no photonic band gap is formed can allow some degree of variation in hole pattern. Accordingly, the waveguide element can be produced by an extremely simple and inexpensive production method.

DETAILED DESCRIPTION OF THE EMBODIMENTS

Embodiments of the present invention are described below, where like features are denoted by the same reference labels throughout the detailed description of the drawings. However, the present invention is not limited to these embodiments.

A. Overview of Waveguide Element

Figure 1:
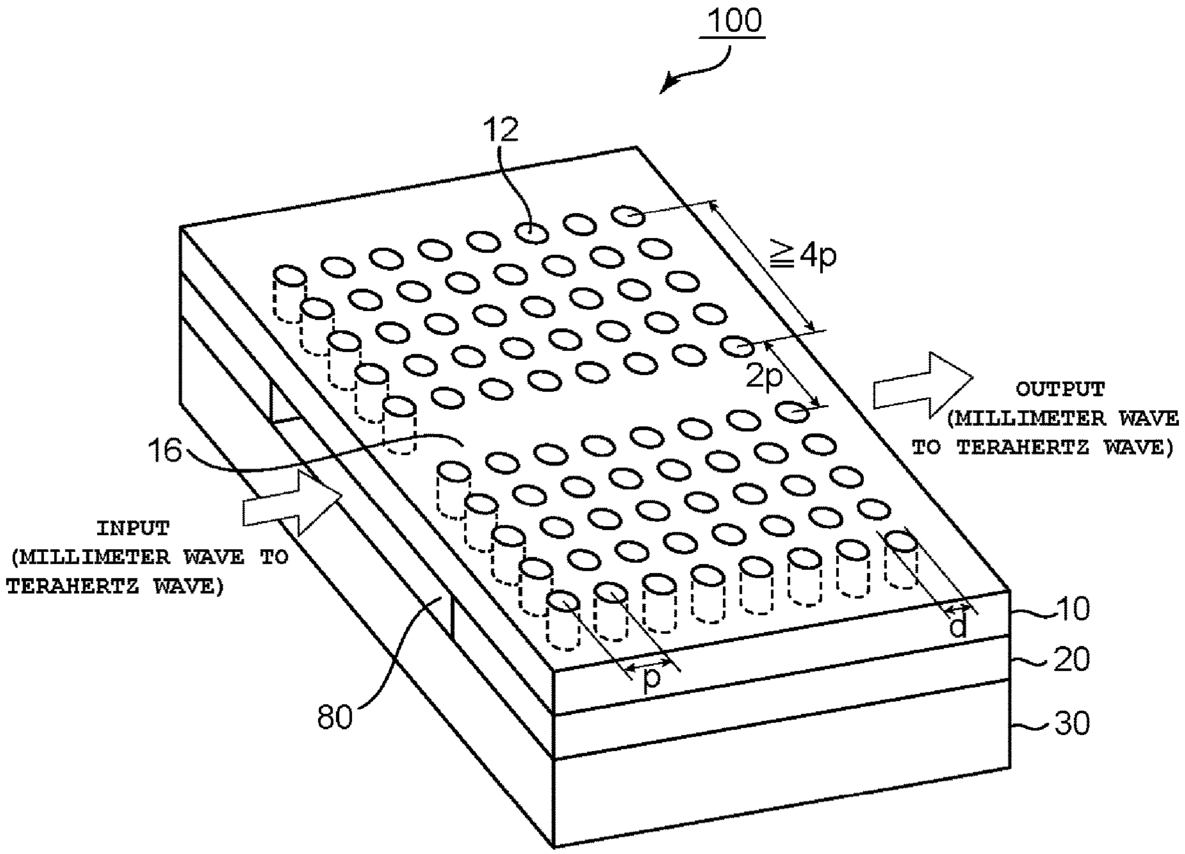
FIG. 1 is a schematic perspective view of a waveguide element according to one embodiment of the present invention.

FIG. 1 is a schematic perspective view of a waveguide element according to one embodiment of the present invention. A waveguide element 100 of the illustrated example includes: a dielectric portion 10 having holes 12 periodically formed in a substrate made of a ceramics material; a low-dielectric constant portion 80 having a dielectric constant smaller than the dielectric constant of the dielectric portion 10; and a support substrate 30 arranged below the dielectric portion 10, the support substrate being configured to support the dielectric portion 10. The arrangement of the support substrate can improve the strength of the waveguide element. As a result, the thickness of the dielectric portion can be reduced. The waveguide element 100 of the illustrated example may further include, for example, a joining portion 20 configured to integrate the dielectric portion 10 and the support substrate 30 with each other, and a cavity (air portion) defined by the lower surface of the dielectric portion 10, the upper surface of the support substrate 30, and the joining portion 20. In this case, the cavity (air portion) can function as the low-dielectric constant portion 80. When no joining portion is arranged, the cavity (air portion) may be formed in the support substrate. A part, such as a semiconductor circuit or an electromagnetic wave oscillator, may be formed on the support substrate.

The waveguide element according to the embodiment of the present invention can typically function as a waveguide that guides waves ranging from a millimeter wave to a terahertz wave from an input side to an output side of the waveguide element. The term "millimeter wave" typically refers to an electromagnetic wave having a frequency of from about 30 GHz to about 300 GHz, and the term "terahertz wave" typically refers to an electromagnetic wave having a frequency of from about 300 GHZ to about 20 THz. Accordingly, the waveguide element can typically function as a waveguide configured to guide an electromagnetic wave having a frequency of 30 GHz or more and 20 THz or less.

Figure 2:
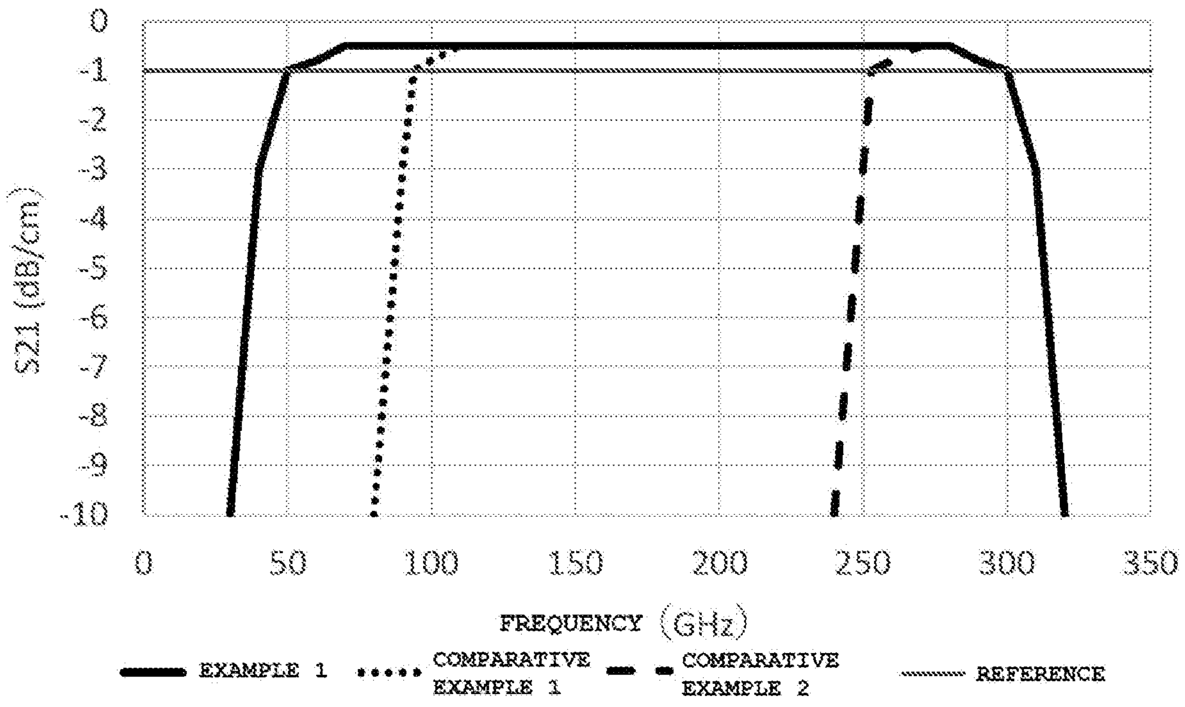
FIG. 2 is an explanatory graph for showing an example of a relationship between the frequency and propagation loss of an electromagnetic wave in the waveguide element according to the embodiment of the present invention through comparison to a waveguide element using an effective dielectric clad formed from a semiconductor and a waveguide element using a photonic crystal formed from a ceramics material.

In the waveguide element according to the embodiment of the present invention, the frequency range of the electromagnetic wave in which the absolute value of a propagation loss becomes 1 dB/cm or less is typically 50 GHz or more. In other words, the waveguide element can function as a so-called "wideband waveguide element" that shows a small propagation loss over a wide frequency range. Such wideband characteristic may be typically achieved by forming the dielectric portion 10 from the ceramics material and/or turning the periodic pattern of the holes 12 in the dielectric portion 10 into a hole pattern in which no photonic band gap (forbidden band) is formed (i.e., by adopting a configuration that is not a photonic crystal). Such dielectric portion may be referred to as "effective dielectric clad (EMC)." FIG. 2 is an explanatory graph for showing an example of a relationship between the frequency (GHz) and propagation loss (S21 in dB/cm) of the electromagnetic wave in the waveguide element according to the embodiment of the present invention through comparison to a waveguide element using an effective dielectric clad formed from a semiconductor and a waveguide element using a photonic crystal formed from a ceramics material. As is apparent from FIG. 2, in the waveguide element according to the embodiment of the present invention (i.e., Example 1), the frequency region of the electromagnetic wave in which the absolute value of the propagation loss becomes 1 dB/cm or less (the propagation loss becomes −1 dB/cm or more) is from about 50 GHz to about 300 GHz (i.e., the range is about 250 GHZ). Meanwhile, in the waveguide element using the effective dielectric clad formed from the semiconductor (i.e., Comparative Example 1), the range is about 205 GHZ (from about 95 GHz to about 300 GHz), and in the waveguide element using the photonic crystal formed from the ceramics material (i.e., Comparative Example 2), the range is about 45 GHZ (from about 255 GHz to about 300 GHZ). As described above, the waveguide element (ceramics material/EMC mode) according to the embodiment of the present invention can achieve significant band widening as compared to the semiconductor/EMC mode and the ceramics material/photonic crystal mode. FIG. 2 is an example, and in the embodiment of the present invention, appropriate design of the periodic pattern of the holes 12 can achieve such band widening as described above in a predetermined region of from a millimeter wave to a terahertz wave. According to the embodiment of the present invention, even in a region except such frequency region as described above (of from about 50 GHZ to about 300 GHz), for example, in the frequency region of from 90 GHz to 400 GHz, for example, in the frequency region of from 400 GHz to 700 GHz, for example, in the frequency region of from 900 GHz to 1.5 THz, or for example, in the frequency region of from 1 THz to 3 THz, the frequency range of the electromagnetic wave in which the absolute value of the propagation loss becomes 1 dB/cm or less may be set to, for example, 50 GHz or more, for example, from 50 GHz to 300 GHz, or for example, from 400 GHz to 600 GHZ. The term "frequency region" as used herein means, for example, a predetermined region in the axis of abscissa of the graph of FIG. 2 (in the cases of waves ranging from a millimeter wave to a terahertz wave, the region may be present at frequencies higher than those of the graph), and the term "frequency range" as used herein means, for example, a frequency range in the graph of FIG. 2 in which the propagation loss is on or above a reference line.

The normalized frequency P/A of the waveguide element according to the embodiment of the present invention may be, for example, from 0.05 to 0.3, may be, for example, from 0.05 to 0.25, may be, for example, from 0.1 to 0.3, or may be, for example, from 0.1 to 0.25. Herein, P represents the pitch of the holes 12 and λ represents the wavelength of the electromagnetic wave. The pitch P of the holes is described in the section B to be described later for the dielectric portion. When the normalized frequency P/λ falls within such ranges, the electromagnetic wave is not diffracted in the periodic holes, and hence the periodic holes effectively function as a low-dielectric constant portion. The foregoing corresponds to behavior as a clad in an optical fiber. In the case of a photonic crystal, the wavelength dispersion characteristic of a propagation constant largely changes, and hence a group refractive index increases. Accordingly, the propagation velocity of a signal pulse is small, and hence a large delay of an electrical signal becomes a problem. Meanwhile, in the case of the EMC mode, an effective dielectric constant (refractive index) can be reduced, and hence a group velocity does not reduce. Accordingly, the delay can be suppressed.

The spot size in a lateral direction of the electromagnetic wave to be output from the waveguide element according to the embodiment of the present invention may be, for example, from 350 μm to 1,000 μm, may be, for example, from 450 μm to 800 μm, or may be, for example, from 500 μm to 700 μm. When the spot size falls within such ranges, the electromagnetic wave is easily aligned with the electric field of an antenna, an oscillator, or a waveguide tube, and hence such product and the waveguide element can be easily connected to each other.

The term "waveguide element" as used herein encompasses both of a wafer having formed thereon at least one waveguide element and a chip obtained by cutting the wafer.

The constituents of the waveguide element are specifically described below.

B. Dielectric Portion

As described above, the dielectric portion 10 has the holes 12 periodically formed in the substrate made of the ceramics material. The ceramics material that may be used in the embodiment of the present invention has a small dielectric constant (real part) and a small dielectric constant (imaginary part), and hence can reduce the delay and loss of an electric signal propagating in the dielectric portion. In one embodiment, the substrate includes a sintered body of the ceramics material (e.g., ceramics powder). The sintered body is polycrystalline, and hence can reduce anisotropy in the substrate. Accordingly, a variation in characteristic (typically, dielectric constant) depending on the position of the material in the waveguide element, the variation resulting from the anisotropy, can be significantly suppressed. As a result, a propagation loss depending on, for example, the position or direction thereof in the waveguide element can be suppressed. From this viewpoint, the ceramics material is preferably polycrystalline or amorphous, more preferably amorphous. An amorphous material can suppress scattering due to a grain boundary peculiar to a polycrystalline material, and hence can further reduce the anisotropy. Thus, the effect of the use of the ceramics material may be more significant. The use of a polycrystalline or amorphous ceramics material can reduce the complex term of the dielectric constant (representing a loss) at a frequency of, for example, 0.5 THz or less, and reduce a variation therein. Further, while a ripple in which the complex term of a dielectric constant suddenly fluctuates to a large extent in a low-frequency region (e.g., 0.5 THz or less) often occurs in a single crystal, the use of the polycrystalline or amorphous ceramics material can significantly suppress such ripple. A complex dielectric constant may be measured by using, for example, terahertz time-domain spectroscopy.

A semiconductor has heretofore been used in a waveguide element in each of the EMC mode and the photonic crystal mode in many cases. This is because a precise hole pattern can be formed by utilizing semiconductor processes, such as photolithography and etching. Such precise hole pattern is particularly suitable in the photonic crystal mode. However, a semiconductor material has a large dielectric constant, and hence the delay of an electric signal propagating in a photonic crystal is large. Further, the semiconductor material is a single crystal, and hence has large anisotropy. Accordingly, a variation in characteristic (typically, dielectric constant) of the material depending on the direction in which an electromagnetic wave in the waveguide element propagates and the polarization of the wave is large. Meanwhile, the ceramics material (in particular, a sintered body) has a problem in that a precise hole pattern is difficult to form because the semiconductor processes cannot be utilized, though the material has an advantage in that both dielectric constant and anisotropy are small. Herein, in the embodiment of the present invention, the adoption of the EMC mode allows some degree of variation in accuracy of the hole pattern because the periodic holes are not intended to function as a diffraction grating, and hence there is no need to form a photonic band gap. Accordingly, in the embodiment of the present invention, the effect of the use of the ceramics material is significant because the problems of the ceramics material have substantially no adverse effects, and hence only the advantage thereof can be utilized. A method of forming the dielectric portion is described later in section C of this description.

The dielectric constant of the dielectric portion (substantially, the ceramics material) at from 100 GHz to 10 THz is preferably 10.0 or less, more preferably from 3.7 to 10.0, still more preferably from 3.8 to 9.0. When the dielectric constant is excessively large, the delay of an electric signal propagating may become larger.

The resistivity of the dielectric portion (substantially, the ceramics material) is preferably 100 kΩ·cm or more, more preferably 300 kΩ·cm or more, still more preferably 500 kΩ·cm or more, particularly preferably 700 kΩ·cm or more. When the resistivity falls within such ranges, an electromagnetic wave can be propagated in the material with a low loss without affecting electronic conduction. Although details about the above-described phenomenon are unclear, the following assumption may be made: when the resistivity is small, the electromagnetic wave is coupled with an electron, and hence the energy of the electromagnetic wave is reduced by the electron conduction, with the result that the loss occurs. From this viewpoint, the resistivity is preferably as large as possible. The resistivity may be, for example, 3,000 kΩ (3 MΩ)·cm or less.

The dielectric loss (tanδ) of the dielectric portion (substantially, the ceramics material) is preferably 0.01 or less, more preferably 0.008 or less, still more preferably 0.006 or less, particularly preferably 0.004 or less at the frequency at which the waveguide element is used. When the dielectric loss falls within such ranges, the propagation loss in the waveguide can be reduced. The dielectric loss is preferably as small as possible. The dielectric loss may be, for example, 0.001 or more.

The bending strength of the dielectric portion (substantially, the substrate) is preferably 50 MPa or more, more preferably 60 MPa or more. When the bending strength falls within such ranges, the substrate hardly deforms, and hence the diameters of the holes and the period of the holes become stable. Thus, a waveguide element showing small changes in characteristics can be achieved. The bending strength is preferably as large as possible. The bending strength may be, for example, 700 MPa or less.

The coefficient of thermal expansion (i.e., coefficient of linear expansion) of the dielectric portion (i.e., substantially, the substrate) is preferably $10\times10^{-6}$/K or less, more preferably $8\times10^{-6}$/K or less. When the coefficient of thermal expansion falls within such ranges, the thermal deformation (typically, warping) of the substrate can be satisfactorily suppressed.

The dielectric portion (substantially, the substrate) may be formed from any appropriate ceramics material as as such characteristics as described above can be achieved. Examples of the ceramics material include quartz glass, aluminum nitride (AlN), aluminum oxide ($Al_2O_3$), silicon carbide (SiC), magnesium oxide (MgO), and spinel ($MgAl_2O_4$).

The thickness of the dielectric portion (substantially, the substrate) is preferably from 10 μm to 1 mm, more preferably from 0.2 mm to 0.8 mm. When the thickness falls within such ranges, there can be achieved a waveguide element, which is thin and has a sufficient mechanical strength. Further, the propagation loss can be reduced.

As described above, the dielectric portion 10 has the holes 12 periodically formed in the substrate. Any appropriate shape may be adopted as the shape of each of the holes as long as electromagnetic waves ranging from a millimeter wave to a terahertz wave can be guided. Specific examples of the shape of each of the holes include a substantially spherical shape, an elliptical spherical shape, a substantially circular columnar shape, a polygonal columnar shape (the plan-view shape is, for example, a triangle, a quadrangle, a pentagon, a hexagon, or an octagon), and an indeterminate shape. The holes may be through-holes, and for example, a plurality of substantially spherical holes may communicate with respect to each other.

The size of each of the holes is preferably from 10 μm to 0.8 mm, more preferably from 50 μm to 0.6 mm, still more preferably from 70 μm to 0.4 mm. When the hole size falls within such ranges, satisfactory waveguide can be achieved in each of a millimeter wave band and a terahertz wave band. In addition, even when a periodic hole structure is formed, a waveguide element that is stable from the respective viewpoints of a mechanical strength and long-term reliability can be achieved.

The porosity of the substrate is as follows: pores each having a pore size of 1 μm or more are present at a ratio of preferably from 0.5 ppm to 3,000 ppm, more preferably from 0.5 ppm to 1, 000 ppm, still more preferably from 0.5 ppm to 100 ppm. When the porosity falls within such ranges, densification can be achieved. Further, by virtue of a synergistic effect with the above-mentioned effect of setting the hole size within a predetermined range, even when a periodic hole structure is formed, a waveguide element that is stable from the respective viewpoints of a mechanical strength and long-term reliability can be achieved. Further, the following advantage is obtained: the grain diameter of the ceramics material can be reduced, and hence the shapes of the holes can be made uniform without any variation, and the band width can be widened. When the porosity is more than 3,000 ppm, the propagation loss in the waveguide may become larger. It is difficult to set the porosity to be less than 0.5 ppm through a technology including using the sintered body of the ceramics material. In this description, the "pores" mean air bubbles (micropores) of the substrate (ceramics material) itself, and are different from the holes 12 to be formed as a periodic pattern.

The sizes of the pores or the holes each have the following meanings: when the pores or the holes are each a substantially spherical shape, the sizes are each the diameter of the sphere; when the pores or the holes are each a substantially circular columnar shape, the sizes are each a diameter when the pore or the hole is viewed in plan view; and when the pores or the holes are each any other shape, the sizes are each the diameter of a circle inscribed in the pore or the hole. The presence or absence of the pores or the holes may be recognized through use of, for example, optical computed tomography (CT) or a transmittance-measuring device. The sizes of the pores or the holes may be measured with, for example, a scanning electron microscope (SEM). The sizes of the holes are relatively large, and hence may also be measured with a stereomicroscope or a laser shape-measuring device.

As described above, the holes 12 may be formed as a periodic pattern. The holes 12 are typically arrayed so as to form regular lattices. Any appropriate form may be adopted as the form of each of the lattices as long as a millimeter wave to a terahertz wave can be guided. Typical examples thereof include a triangular lattice and a square lattice.

The lattice pattern of the holes may be appropriately set in accordance with purposes and the wavelength of an electromagnetic wave to be guided. In the illustrated example, the holes each having a diameter "d" form square lattices at a period P. The square lattice patterns are formed on both the sides of the waveguide element, and the main waveguide 16 is formed in the central portion thereof where no lattice pattern is formed. In the embodiment of the present invention, even the portions each having formed therein the lattice pattern can guide an electromagnetic wave because no photonic band gap is formed. The width of the main waveguide 16 may be, for example, from 1.01P to 3P (2P in the illustrated example) with respect to the hole period P. The number of the rows of the holes (hereinafter sometimes referred to as "lattice rows") in the waveguide direction may be from 3 to 10 (5 rows in the illustrated example) on each side of the optical waveguide.

The hole period P is preferably 50 μm or more, more preferably from 50 μm to 1 mm, still more preferably from 0.2 mm to 0.8 mm. The hole period P has a variation of preferably P/100 (0.01P) or more, more preferably from 0.05P to 0.3P. As described above, in the embodiment of the present invention, the adoption of the EMC mode allows some degree of variation in accuracy (typically, hole period) of the hole pattern because there is no need to form a photonic band gap.

In one embodiment, the hole period P may be identical to the thickness of the sintered body (substrate). The diameter "d" of each of the holes is preferably P/100 (0.01P) or more, more preferably from 0.7P to 0.96P, still more preferably from 0.8P to 0.94P with respect to the hole period P. When the diameter "d" of each of the holes and the hole period P satisfy such relationships, both of an effective dielectric constant-reducing effect and a mechanical strength-holding effect can be achieved.

The width of the lattice pattern is preferably 10P or more, more preferably from 12P to 20P. The width of the lattice pattern is a distance between the outermost lattice row in the lattice pattern on one side of the waveguide and the outermost lattice row in the lattice pattern on the other side of the waveguide. Accordingly, the width of the lattice pattern on one side of the waveguide is 4P or more (i.e., ≥4P) like the illustrated example in FIG. 1.

When the diameter "d" of each of the holes, the hole period P, the number of the lattice rows, the number of the holes in one lattice row, the thickness of the substrate, the kind (substantially, refractive index, dielectric constant, resistivity, and the like) of the ceramics material, the width of a portion in the substrate where the holes are not formed, and the like are adjusted by being appropriately combined with each other, a desired waveguide characteristic can be obtained. Although the main waveguide 16 is a belt shape (linear shape) in the illustrated example, a waveguide having a predetermined shape (consequently, a predetermined waveguide direction) can be formed by changing the lattice pattern. For example, the waveguide may extend in a direction (oblique direction) having a predetermined angle with respect to the long-side direction or short-side direction of the waveguide element, or may be bent at a predetermined site (the waveguide direction may change at the predetermined site).

C. Method of Forming Dielectric Portion

A method of producing the dielectric portion (substrate made of the ceramics material having formed therein the holes) is simply described below. In one embodiment, the dielectric portion may be produced by a powder sintering method (substantially slurry casting) that results in the dielectric portion being very close to the final desired shape (i.e., a near-net forming powder sintering method). The powder sintering method (substantially, the slurry casting) is described below as an example of the method of producing the dielectric portion. The dielectric portion may be formed by the machining or laser processing of a wafer produced by typical sintering in accordance with the kind of the ceramics material.

First, a forming mold having protruding portions corresponding to the lattice pattern is prepared. The protruding portions may form holes in a sintered body to be obtained. Accordingly, the shapes, sizes, and the like of the protruding portions may be designed in accordance with the shapes, sizes, and the like of the holes to be formed in the sintered body to be obtained. In one embodiment, through-holes may be formed by the protruding portions.

Next, a slurry containing the powder of the ceramics material, a predetermined dispersant, and a predetermined dispersion medium is cast into the above-mentioned forming mold. The dispersant may be appropriately selected in accordance with the ceramics material. The dispersant is typically an organic compound, more specifically, a resin. The dispersion medium may be an aqueous dispersion medium, or may be an organic solvent-based dispersion medium. Examples of the aqueous dispersion medium include water and a water-soluble alcohol. Examples of the organic solvent-based dispersion medium include paraffin, toluene, and petroleum ether. The slurry is prepared by mixing, for example, the powder of the ceramics material, the dispersant, and the dispersion medium, and as required, any other component (e.g., an additive). Examples of mixing means include a ball mill pot, a homogenizer, and a disperser.

Next, the cast slurry is solidified in the forming mold. Further, the solidified product is released from the mold, and is sintered under predetermined conditions. Thus, the sintered body of the ceramic material (dielectric portion) having a predetermined hole pattern can be obtained. Firing for obtaining the sintered body typically includes a firing step and a calcining step to be performed before the firing step as required. A calcination temperature is preferably 1, 000° C. or more and less than 1,250° C., more preferably from 1,000° C. to 1,200° C. When the calcination temperature falls within such ranges, a sintered body excellent in transparency can be obtained. A firing temperature is preferably from 1,500° C. to 1, 700° C. The rate of temperature increase at the time of the firing is preferably 20° C./min or more at 1, 000° C. or more, and is preferably 20° C./min or more, more preferably 25° C./min or more at 1,200° C. or more. When the rate of temperature increase falls within such ranges, the deformation of the sintered body to be obtained can be suppressed. In one embodiment, degreasing is performed before the firing. A degreasing temperature is preferably from 300° C. to 800° C. The above-mentioned calcination may double as the degreasing. The performance of the degreasing at 1,200° C. or less can suppress the deposition of a crystal phase.

A desired sintered body (dielectric portion) can be obtained by appropriately combining, for example, the kind of the ceramic material, the concentration of the ceramic material in the slurry, the kind and addition amount of the dispersant, the kinds, number, combination, and addition amounts of the additives, and firing conditions.

While the sintered body of the ceramic material is difficult to etch and machine, the formation of a hole pattern before the sintering as described above enables simple and low-cost formation of the predetermined hole pattern in the sintered body of the ceramic material. Further, as described above, in the embodiment of the present invention, the adoption of the EMC mode allows some degree of variation in accuracy of the hole pattern because there is no need to form a photonic band gap. Accordingly, in the embodiment of the present invention, the effect is significant because the problems of the sintered body of the ceramics material have substantially no adverse effects, and hence only the advantage thereof can be utilized. As a result, a waveguide element, which shows small delay of an electric signal, shows a small propagation loss, and has uniform characteristics over the entirety of the waveguide element, can be obtained simply and at low cost. When the relative dielectric constant of the substrate material is represented by $\varepsilon$, a frequency suitable for the waveguide element produced by such method is preferably from $125/\sqrt{\varepsilon}$ GHz to $15,000/\sqrt{\varepsilon}$ GHz.

D. Support Substrate

Any appropriate configuration may be adopted for the support substrate 30. Specific examples of a material for forming the support substrate 30 include silicon (Si), glass, sialon ($Si_3N_4$—$Al_2O_3$), mullite ($3Al_2O_3 \cdot 2SiO_2$, $2Al_2O_3 \cdot 3SiO_2$), aluminum nitride (AlN), silicon nitride ($Si_3N_4$), magnesium oxide (MgO), aluminum oxide ($Al_2O_3$), spinel ($MgAl_2O_4$), sapphire, quartz glass, crystal, gallium nitride (GaN), silicon carbide (SiC), and gallium oxide ($Ga_2O_3$). Of those materials, silicon, gallium nitride, silicon carbide, or germanium oxide is preferred. Such material enables the integration of the support substrate with a semiconductor circuit, such as an amplifier or a mixer, when the waveguide element is used in a front end for waves ranging from a millimeter wave to a terahertz wave (e.g., as an antenna substrate). It is preferred that the coefficient of linear expansion of the material for forming the support substrate 30 be as close as possible to the coefficient of linear expansion of a material for forming the dielectric portion (substantially, the substrate) 10. With such configuration, the thermal deformation (typically, warpage) of the waveguide element can be suppressed. It is preferred that the coefficient of linear expansion of the material for forming the support substrate 30 fall within a range of from 50% to 150% with respect to the coefficient of linear expansion of the material for forming the dielectric portion (substantially, the substrate) 10. From this viewpoint, the material for the support substrate may be the same as the material for the dielectric portion (substantially, the substrate) 10.

E. Joining Portion

As shown in FIG. 1, the joining portion 20 is interposed between the dielectric portion 10 and the support substrate 30 to integrate the substrates with each other. The joining portion 20 is formed as the remaining portion of etching at the time of the formation of the cavity 80. The joining portion 20 typically integrates the dielectric portion 10 and the support substrate 30 with each other through direct joining of an upper layer and a lower layer. The integration of the dielectric portion 10 and the support substrate 30 through the direct joining can satisfactorily suppress peeling in the waveguide element.

The term "direct joining" as used herein means that two layers or substrates (herein, the upper layer and the lower layer) are joined to each other without using any adhesive. The form of the direct joining may be appropriately set depending on the configuration of the layers to be joined to each other. For example, the direct joining may be achieved by the following procedure. In a high vacuum chamber (e.g., about $1\times10^{-6}$ Pa), a neutralized beam is applied to each joining surface of the upper layer and the lower layer. As a result, each joining surface is activated. Then, in a vacuum atmosphere, the activated joining surfaces are brought into contact with each other and joined to each other at normal temperature. A force applied to the upper layer and lower layer at the time of the joining may be, for example, from 100 N to 20,000 N. In one embodiment, when the surface activation is performed with a neutralized beam, an inert gas is introduced into a chamber, and a high voltage is applied from a DC power source to electrodes arranged in the chamber. With such configuration, electrons move due to an electric field generated between the electrode (positive electrode) and the chamber (negative electrode), and a beam of atoms and ions caused by the inert gas is generated. Of the beams having reached a grid, an ion beam is neutralized by the grid, and hence the beam of neutral atoms is emitted from a high-speed atom beam source. An atomic species for forming the beam is preferably an inert gas element (e.g., argon (Ar) or nitrogen (N)). A voltage at the time of activation by beam irradiation is, for example, from 0.5 kV to 2.0 kV, and an electric current is, for example, from 50 mA to 200 mA. A method for the direct joining is not limited thereto, and a surface activation method including using a fast atom beam (FAB) or an ion gun, an atomic diffusion method, a plasma joining method, or the like may also be applied. Any appropriate configuration may be adopted for each of the upper layer and the lower layer in accordance with purposes.

F. Low-Dielectric Constant Portion

As described above, the low-dielectric constant portion 80 may be typically formed as a cavity (air portion). As described above, the low-dielectric constant portion (cavity) 80 may be typically formed by removing the upper layer and the lower layer through etching. The width of the cavity is preferably larger than the width of the main waveguide 16. The low-dielectric constant portion (cavity) 80 preferably extends up to at least the third lattice row from the waveguide 16. The electromagnetic wave propagates in the waveguide, and moreover, part of the electromagnetic wave may diffuse up to the lattice row near the waveguide. Accordingly, the arrangement of the cavity directly below such lattice row can suppress a propagation loss. From this viewpoint, the low-dielectric constant portion (cavity) 80 more preferably extends up to the fifth row from the waveguide 16, and particularly preferably extends so as to overlap the entire region of a hole-formed portion. When the configurations of the upper layer and the lower layer, a mask, an etching manner, and the like are appropriately combined, the cavity can be formed by an efficient procedure and with high accuracy. Alternatively, as described above, when no joining portion is arranged, the cavity (air portion) may be formed in the support substrate. In the embodiment of the present invention, the dielectric portion for forming the waveguide is formed from the ceramics material, and hence the low-dielectric constant portion is preferably an air portion. When the low-dielectric constant portion is an air portion, the effective dielectric constant of a clad can be reduced. As a result, even when the number of the periodic holes is reduced, the electromagnetic wave can be propagated with a low loss, and hence the downsizing of the waveguide element can be achieved.

As described above, the dielectric constant of the low-dielectric constant portion is smaller than that of the dielectric portion. The dielectric constant of the low-dielectric constant portion at from 100 GHz to 10 THz is preferably 11 or less, more preferably from 2 to 10, still more preferably from 3 to 8.

G. Another Embodiment of Waveguide Element

Another embodiment of the waveguide element is described below.

As illustrated in each of FIG. 3 to FIG. 8, the waveguide element according to one embodiment may include an active element capable of at least one of the transmission, reception, or amplification of an electromagnetic wave having a frequency of 30 GHz or more and 20 THz or less, the active element being supported by the support substrate.

In such waveguide element, the active element and the dielectric portion are integrated with each other to enable a wafer process, and hence characteristic variations can be reduced. Thus, an improvement in productivity of the waveguide element can be achieved. Accordingly, an inexpensive waveguide element can be achieved.

The waveguide element including the active element supported by the support substrate includes a configuration in which a line-defect waveguide formed in the substrate and the active element are connected to each other so that an electromagnetic wave can be propagated therebetween.

Figure 3:
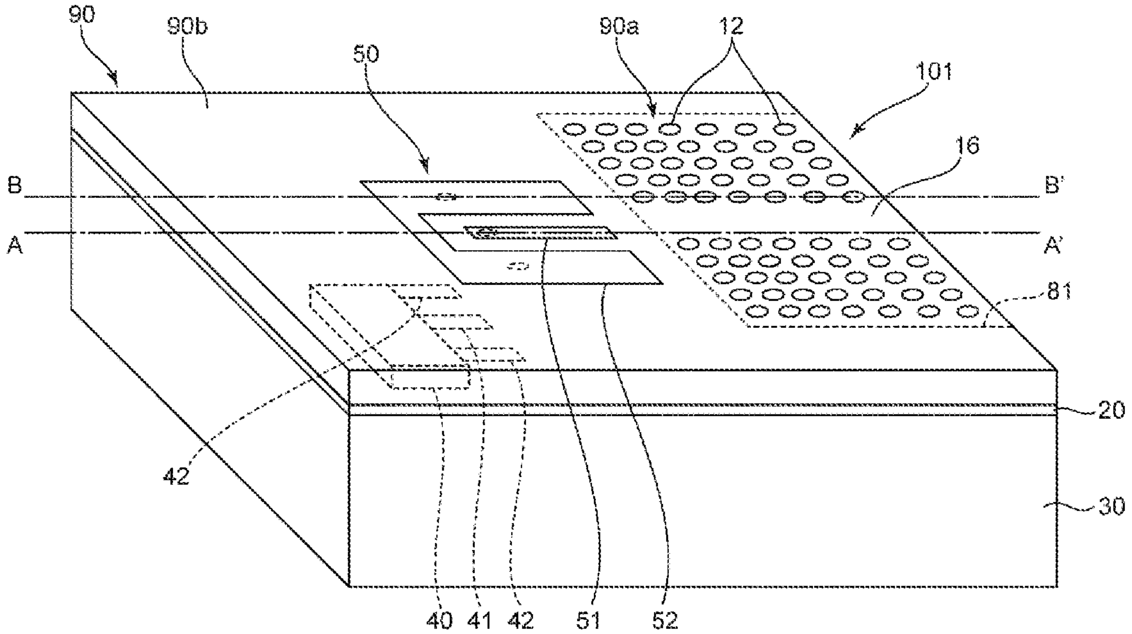
FIG. 3 is a schematic perspective view of a waveguide element according to another embodiment of the present invention.
Figure 4:
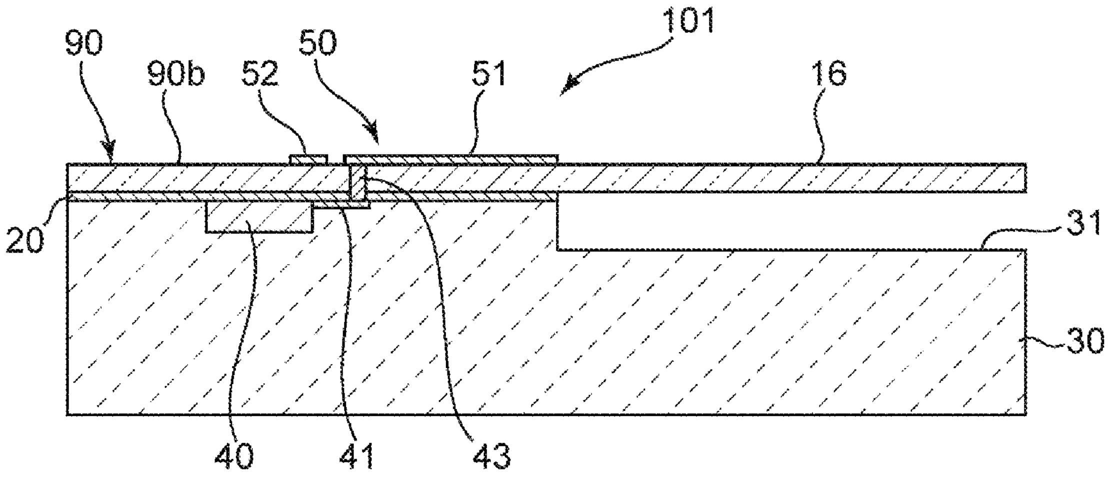
FIG. 4 is a sectional view of the waveguide element taken along the line AA' of FIG. 3.
Figure 5:
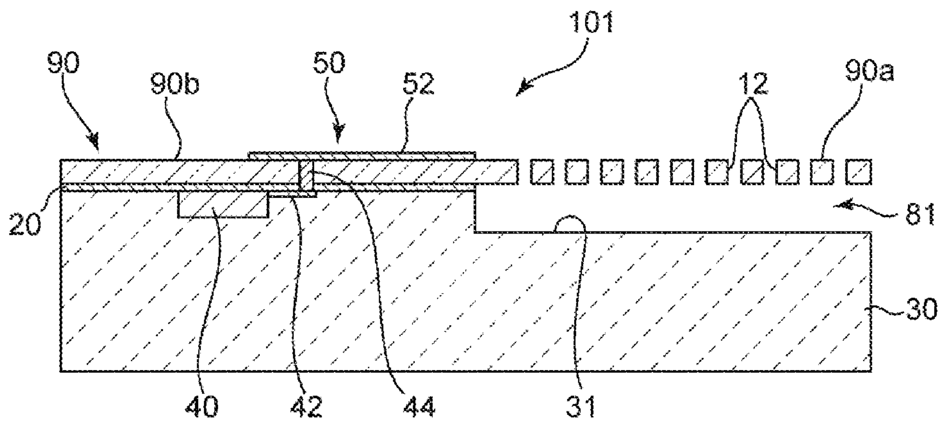
FIG. 5 is a sectional view of the waveguide element taken along the line BB' of FIG. 3.

A waveguide element 101 illustrated in each of FIG. 3 to FIG. 5 includes: a line-defect first waveguide formed in the substrate; and a second waveguide (typically, a coplanar waveguide in the illustrated example) positioned between the active element and the first waveguide in the propagation path of the electromagnetic wave, the second waveguide being capable of guiding the electromagnetic wave. In one embodiment, the second waveguide can guide the electromagnetic wave transmitted from the active element to the first waveguide.

The waveguide element 101 of the illustrated example includes: a dielectric portion 90 having the holes 12 periodically formed in the substrate made of the ceramics material; the support substrate 30 arranged below the dielectric portion 90, the support substrate being configured to support the dielectric portion 90; an active element 40 supported by the support substrate 30; and a coplanar electrode pattern 50.

The dielectric portion 90 includes: an EMC portion 90*a* having the holes 12 periodically formed in the substrate made of the ceramics material; the line-defect waveguide 16 defined as a portion in the EMC portion 90*a* (the substrate made of the ceramics material) where the holes 12 are not formed; and any other portion 90*b* except the EMC portion 90*a*. Typically, the holes 12 are not formed in the other portion 90*b*. In the other portion 90*b*, holes, which are present at a period different from that of the holes 12 or are present independently, may be formed for suppressing the leakage of the electromagnetic wave and a stray capacitance. In this case, a conductive film may be formed in each of the holes to cause the hole to serve as a so-called "via hole" that forms a short circuit between the upper surface of the dielectric portion 90 and a surface opposite thereto. A conductive film material may be completely embedded in the via hole.

In one embodiment, the support substrate 30 has a depressed portion 31. The depressed portion 31 is depressed downward from the upper surface of the support substrate 30. The depressed portion 31 is typically opened toward one side in the waveguide direction of the waveguide 16. The lower surface of the dielectric portion 90 and the depressed portion 31 of the support substrate 30 define a cavity 81. Thus, the waveguide element 101 includes the cavity 81. The cavity 81 is a low-dielectric constant portion, and functions as a lower clad. When the waveguide element includes the cavity, the leakage of the electromagnetic wave propagating in the waveguide from the waveguide can be stably suppressed.

The cavity 81 typically overlaps the waveguide 16 in the thickness direction of the substrate made of the ceramics material. The width of the cavity 81 is described in the same manner as in the low-dielectric constant portion (cavity) 80. The cavity 81 more preferably extends so as to overlap the entire region of the EMC portion 90*a* like the illustrated example.

In one embodiment, the substrate made of the ceramics material (the dielectric portion 90) and the support substrate 30 are directly joined to each other by the joining portion 20. In the illustrated example, the joining portion 20 is interposed between the other portion 90*b* in the dielectric portion 90 and a portion except the depressed portion 31 in the support substrate 30 to integrate the substrate made of the ceramics material and the support substrate 30 with each other.

The active element 40 is supported by the support substrate 30, and is typically buried in the portion except the depressed portion 31 on the upper surface of the support substrate 30. Examples of the active element 40 include a resonance tunnel diode, a Schottky barrier diode, a CMOS transceiver, and an InP HEMT.

In the illustrated example, the active element 40 is a resonance tunnel diode. The active element 40 can transmit (can generate and radiate) an electromagnetic wave. The active element 40 includes a first element electrode 41 and two second element electrodes 42. The first element electrode 41 and the two second element electrodes 42 each extend in the waveguide direction of the waveguide 16. The two second element electrodes 42 are arranged in the direction perpendicular to the waveguide direction of the waveguide 16 with a space therebetween. The first element electrode 41 is arranged between the two second element electrodes 42.

The coplanar electrode pattern 50 is arranged on the portion except the EMC portion 90*a* (i.e., the other portion 90*b*) in the substrate made of the ceramics material. The coplanar electrode pattern 50 and the other portion 90*b* positioned below the coplanar electrode pattern 50 form the coplanar waveguide serving as an example of the second waveguide.

The coplanar electrode pattern 50 is in line with the waveguide 16 in the waveguide direction. The coplanar electrode pattern 50 includes: a signal electrode 51 extending in the waveguide direction of the waveguide 16; and a ground electrode 52 having a U-shape when viewed in plan view, the shape being opened toward the waveguide 16. The signal electrode 51 is arranged on the inner side of the ground electrode 52, and is arranged with a space from the ground electrode 52. Thus, a void portion (slit) extending in the waveguide direction of the waveguide 16 is formed between the signal electrode 51 and the ground electrode 52. The signal electrode 51 is electrically connected to the first element electrode 41 of the active element 40 through a via 43. The ground electrode 52 is electrically connected to the second element electrodes 42 of the active element 40 through two vias 44.

The second waveguide is not limited to the coplanar waveguide, and may be formed as, for example, a microstrip waveguide or a waveguide tube-integrated waveguide.

Next, the propagation of the electromagnetic wave in the waveguide element 101 is described.

The application of a voltage to the coplanar electrode pattern 50 generates an electric field between the signal electrode 51 and the ground electrode 52. In addition, the application of a voltage to the active element 40 causes the active element 40 to transmit the electromagnetic wave. The electromagnetic wave transmitted from the active element 40 is propagated toward the signal electrode 51 through the via 43, and is then coupled with the electric field formed between the signal electrode 51 and the ground electrode 52 to be propagated in the substrate made of the ceramics material toward the line-defect waveguide 16. As described above, the electromagnetic wave transmitted from the active element 40 is first propagated to the coplanar waveguide, and is then propagated to the line-defect waveguide 16.

Figure 6:
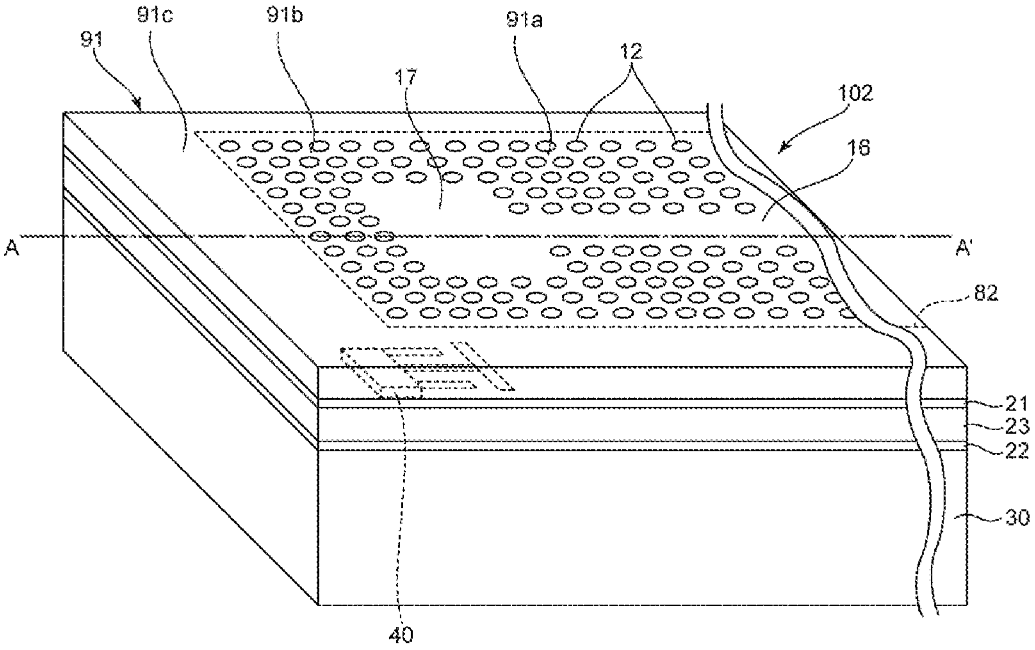
FIG. 6 is a schematic perspective view of a waveguide element according to still another embodiment of the present invention.
Figure 7:
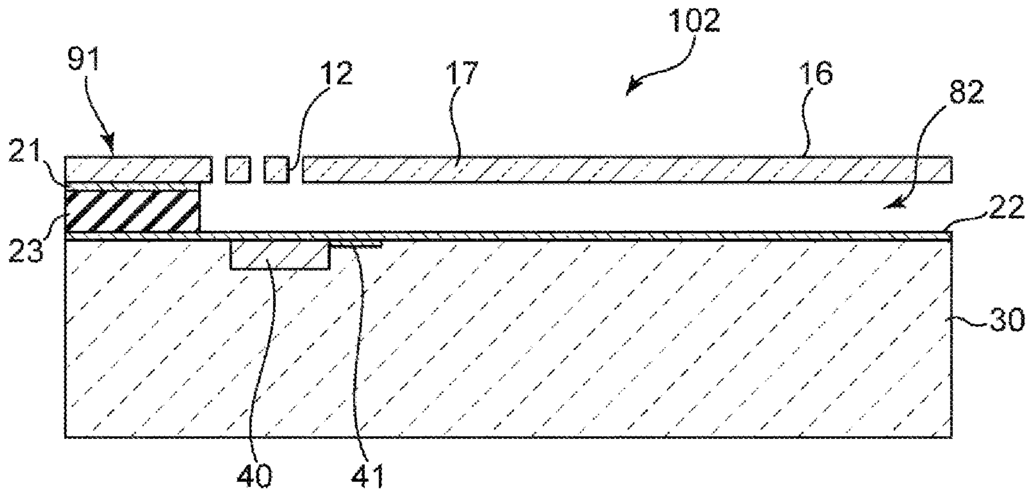
FIG. 7 is a sectional view of the waveguide element taken along the line AA' of FIG. 6.
Figure 8:
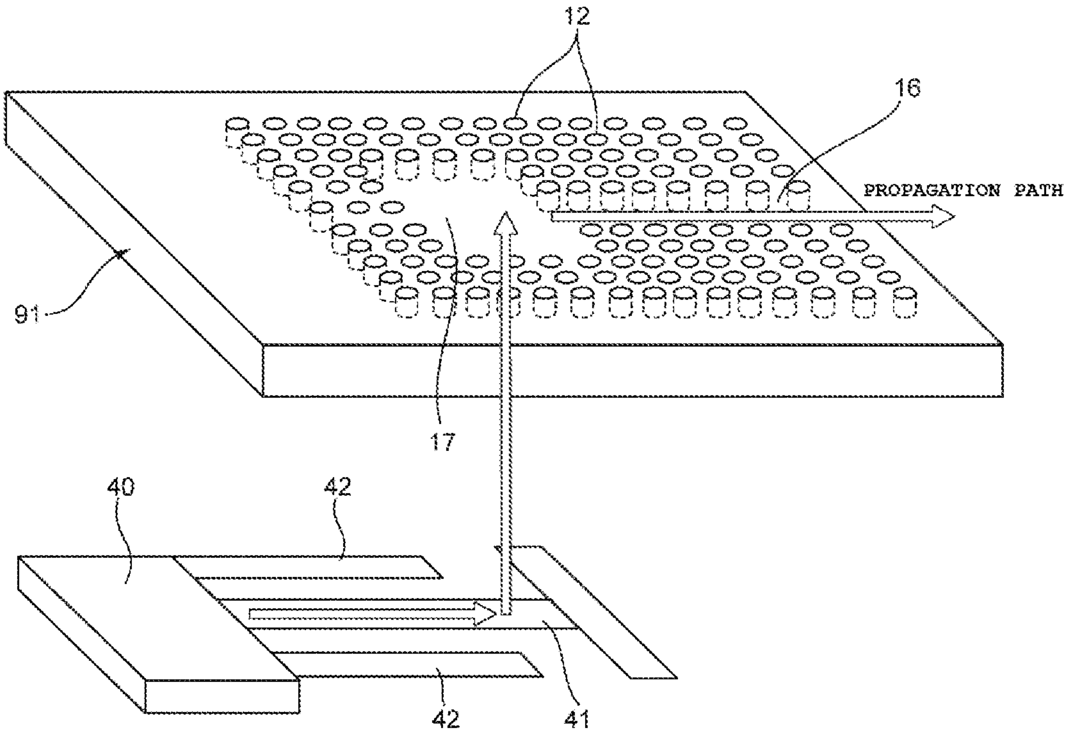
FIG. 8 is a schematic explanatory view for illustrating the propagation path of an electromagnetic wave in the waveguide element of FIG. 6.

A waveguide element 102 illustrated in each of FIG. 6 to FIG. 8 includes a resonator 17, which is positioned between the active element 40 and the waveguide 16, and can guide an electromagnetic wave along a propagation path of the electromagnetic wave. The propagation path of the electromagnetic wave through the waveguide element 102 is exemplified in FIG. 8. The resonator 17 is typically a mode-gap confinement resonator defined as a portion in the substrate made of the ceramics material where no holes are formed. The hole pattern around the resonator 17 is appropriately designed so that a photonic band gap may be expressed. The resonator 17 can receive the electromagnetic wave transmitted from the active element 40, and can transmit the received electromagnetic wave to the waveguide 16.

More specifically, the dielectric portion 91 of the waveguide element 102 includes: an EMC portion 91*a* having formed therein the holes 12 at the above-mentioned period; the line-defect waveguide 16 defined as a portion in the EMC portion 91*a* (substrate made of the ceramics material) where the holes 12 are not formed; a photonic crystal portion 91*b* having formed therein the holes 12 at a period different from that in the EMC portion 91*a*; the mode-gap confinement resonator 17 defined as a portion in the photonic crystal portion 91*b* (substrate made of the ceramics material) where the holes 12 are not formed; and any other portion 91*c* in the dielectric portion 91.

In the photonic crystal portion 91*b*, the hole period P of the holes 12 may satisfy, for example, the following relationship:

$$(1/7)\times(\lambda/n)\leq P\leq 1.4\times(\lambda/n)$$

where λ represents the wavelength (μm) of an electromagnetic wave to be introduced into the waveguide, and "n" represents the refractive index of the ceramic substrate. The refractive index is proportional to the ½-th power of the dielectric constant Er thereof, and hence the "n" in the above-mentioned formula may be replaced with "$(\varepsilon r)^{1/2}$".

When the substrate made of the ceramics material includes quartz glass, the normalized frequency P/λ of the photonic crystal portion 91*b* is more than 0.3, and the normalized frequency P/λ of the EMC portion 91*a* is 0.3 or less.

The resonator 17 is surrounded by the photonic crystal portion 91*b*, can receive the electromagnetic wave transmitted from the active element 40, and can transmit the received electromagnetic wave to the waveguide 16. The resonator 17 is in line with the waveguide 16 in the waveguide direction of the waveguide 16, and is continuous with the waveguide 16. The width (size in the direction perpendicular to the waveguide direction of the waveguide 16) of the resonator 17 is larger than the width of the waveguide 16. In the illustrated example, the resonator 17 is formed so as to be surrounded by three rows of the holes.

In one embodiment, the waveguide element 102 includes an insulating layer 23 positioned between the substrate made of the ceramics material (the dielectric portion 91) and the support substrate 30. A material for the insulating layer 23 is, for example, any one of the above-mentioned ceramics materials, and is preferably, for example, quartz glass.

In the illustrated example, the substrate made of the ceramics material (the dielectric portion 91) and the insulating layer 23 are directly joined to each other by a joining portion 21, and the support substrate 30 and the insulating layer 23 are directly joined to each other by a joining portion 22. The joining portion 21 is interposed between the substrate made of the ceramics material and the insulating layer 23 to integrate the substrate made of the ceramics material and the insulating layer 23 with each other. The joining portion 22 is interposed between the insulating layer 23 and the support substrate 30 to integrate the insulating layer 23 and the support substrate 30 with each other.

In addition, the insulating layer 23 of the illustrated example has a U-shape when viewed in plan view, the shape being opened toward one side in the waveguide direction of the waveguide 16. The lower surface of the dielectric portion 91, the upper surface of the support substrate 30, and the insulating layer 23 define a cavity 82. The cavity 82 may be defined by the lower surface of the dielectric portion 91, the joining portion 22 positioned on the upper surface of the support substrate 30, and the insulating layer 23. Thus, the waveguide element 102 includes the cavity 82.

The cavity 82 typically overlaps the waveguide 16 and the resonator 17 in the thickness direction of the substrate made of the ceramics material, and the width (size in the direction perpendicular to the waveguide direction of the waveguide 16) of the cavity 82 is larger than the width of the resonator 17. The cavity 82 more preferably extends so as to overlap the entire region of the hole-formed portion in the dielectric portion 91 like the illustrated example.

Next, the propagation of the electromagnetic wave in the waveguide element 102 is described.

When a voltage is applied to the active element 40 of the waveguide element 102, the first element electrode 41 functions as an antenna, and hence the electromagnetic wave is transmitted from the first element electrode 41 toward the resonator 17. The electromagnetic wave that has reached the resonator 17 is received by the resonator 17, and is then transmitted from the resonator 17 to the waveguide 16 through a continuous portion between the resonator 17 and the waveguide 16. After that, the electromagnetic wave is propagated to the waveguide 16.

In addition, the mode-gap confinement resonator can receive an electromagnetic wave and can transmit the received electromagnetic wave, and hence the resonator can function as an antenna that receives or transmits an electromagnetic wave having a specific frequency. In addition, the antenna is not limited to the mode-gap confinement resonator. Even a photonic crystal structure free of any portion where no holes are formed can trap an electromagnetic wave entering from the outside for a specific frequency. The effect can reversibly emit the electromagnetic wave. Accordingly, even the photonic crystal structure free of any portion where no holes are formed can function as the antenna. The antenna may include, for example, a valley photonic crystal structure formed of two different unit cells. Further, when a conductive layer (mirror surface) is formed on the lower surface of the photonic crystal portion 91*b*, a gap therebetween widens a specific frequency band to enable the formation of an antenna that transmits and receives electromagnetic waves covering a wide band.

In each of FIG. 3 to FIG. 8, the following example has been illustrated: the active element has a function of transmitting (generating and radiating) an electromagnetic wave, and the electromagnetic wave transmitted from the active element is coupled with the line-defect waveguide through the second waveguide or the resonator. However, in each of those figures, the following embodiment is easily conceivable: the active element has a function of receiving an electromagnetic wave, and the electromagnetic wave guided in the line-defect waveguide is coupled with the active element through the second waveguide or the resonator.

EXAMPLES

Now, the present invention is specifically described by way of Examples. However, the present invention is not limited to these Examples.

Example 1

A dielectric portion of a waveguide element was produced by the aforementioned near-net forming powder sintering method (substantially, slurry casting). A specific production method is as described below. A forming mold having protruding portions corresponding to a hole pattern was prepared, and fine powder of amorphous quartz, a hydrophilic dispersant (i.e., organic compound) that was decomposed or volatilized by preliminary firing, and a dispersion medium (water) were sufficiently mixed to prepare a slurry for near-net forming having a moisture content of from 15 wt % to 30 wt %. The slurry was cast into the forming mold, and the chemical reaction of the organic compound was utilized to solidify the slurry. The solidified product was released from the forming mold, and was fired at high temperature to produce such a dielectric portion that a periodic hole pattern was formed in a sintered body. The forming mold was designed in consideration of its firing shrinkage ratio so that desired dimensions were obtained after the firing. The produced dielectric portion was set to have a size measuring 35 mm by 10 mm and a thickness of 0.5 mm, and a triangular lattice pattern having a hole diameter of 0.27 mm and a hole period of 0.3 mm was formed therein. A portion where holes were not formed was arranged in the central portion of the element to form a main waveguide having a width of 0.6 mm. To measure the propagation loss of the waveguide, three dielectric portions having waveguide lengths of 10 mm, 30 mm, and 50 mm were produced. The resistivity of a substrate for forming each of the dielectric portions was 1 MΩ·cm.

Next, high-resistance silicon having a thickness of 525 μm was used as a support substrate, and grooves having a width of 0.5 mm, lengths of 10 mm, 30 mm, and 50 mm (each corresponding to the length of the main waveguide), and a depth of 0.25 mm were each formed therein by dry etching so that a portion corresponding to the main waveguide of the dielectric portion became hollow.

Next, the dielectric portion and the silicon substrates were directly joined to each other at normal temperature to produce three waveguide elements different from each other in length of the main waveguide. The resultant waveguide elements were subjected to the following evaluations. The results are shown in Table 1.

(1) Propagation Loss

The propagation losses of the resultant three wave guide elements were measured as described below. A generator for a RF signal having a frequency of 75 GHZ, 200 GHz, or 275 GHZ and a transmitting antenna were connected to the input side of each of the wave guide elements, and a receiving antenna and a RF signal receiver were connected to the output side thereof, followed by the measurement of the RF power of the signal with the RF signal receiver. Propagation losses (dB/cm) were calculated from the measurement results of the three waveguide elements.

(2) Delay of Electric Signal

A phase in the RF signal receiver having a frequency of 275 GHz was measured, and a transmission time (ps) was calculated from a phase difference between the waveguide elements having different waveguide lengths.

(3) Spot Size

The RF signal receiver having a frequency of 275 GHz was connected to each of the waveguide elements, and the spot size of an electromagnetic wave in a lateral direction (horizontal direction) was measured at the output terminal of the waveguide by using a knife edge method.

(4) Band Characteristic

The band characteristics of the waveguide elements were calculated by electromagnetic wave analysis. The results are shown in FIG. 2. A frequency range in which the electromagnetic wave is propagated with a propagation loss of 1 dB/cm or less in terms of absolute value is shown in Table 1.

Comparative Example 1

A dielectric portion was produced by using high-resistance silicon instead of the quartz glass. A specific procedure is as described below. A high-resistance silicon wafer measuring 4 inches long by 4 inches wide by 0.3 mm thick was prepared. A periodic hole portion was patterned on a resist with an aligner, and periodic holes were formed in the wafer (substrate) by dry etching. After forming the periodic holes in the wafer, the wafer was cut to produce a dielectric portion. The dielectric portion had a size measuring 35 mm by 10 mm as in Example 1, and a triangular lattice pattern having a hole radius of 0.072 mm and a hole period of 0.16 mm was formed therein. Waveguides each having a width of 0.36 mm were each formed by arranging, in the central portion of the dielectric portion, a portion where no holes were formed. The lengths of the waveguides were set to 10 mm, 30 mm, and 50 mm as in Example 1. In this comparative example, the dielectric portion and a support substrate were not joined together with each other, and a waveguide element was produced as a single layer of the dielectric portion (silicon substrate). Thus, three waveguide elements different from each other in length of the main waveguide were produced. The resultant waveguide elements were subjected to the same evaluations as those of Example 1. The results are shown in Table 1.

Comparative Example 2

A dielectric portion was produced in the same manner as in Example 1 except that: the hole diameter and the hole period were set to 0.316 mm and 0.45 mm, respectively; and a waveguide having a width of 0.464 mm was formed by arranging, in the central portion of the dielectric portion, a portion where no holes were formed. The resultant dielectric portion was a photonic crystal having formed therein a photonic band gap. The subsequent procedure was the same as that of Example 1. Thus, three photonic crystal elements having different waveguide lengths were produced. The resultant photonic crystal elements were subjected to the same evaluations as those of Example 1. The results are shown in Table 1. The abbreviation "PC" in the table means a photonic crystal.

TABLE 1

| | | Propagation loss | | | Transmission | Spot | Band characteristic |
|---|---|---|---|---|---|---|---|
| | Configuration | 75 GHZ | 200 GHZ | 275 GHZ | time (ps) | size (μm) | (GHz) |
| Example 1 | Ceramics/ EMC | 0.5 | 0.5 | 0.5 | 173 | 650 | 250 |
| Comparative Example 1 | Semiconductor/ EMC | 10 | 0.5 | 0.5 | 316 | 400 | 206 |
| Comparative Example 2 | Ceramics/ PC | 10 | 10 | 0.5 | 195 | 500 | 47 |

As is apparent from Table 1, it is found that the waveguide element (ceramics material/EMC mode) of Example of the present invention shows small delay of an electric signal and shows a small propagation loss over a wide frequency range. Comparative Example 1 in the semiconductor/EMC mode shows extremely large delay of an electric signal, and Comparative Example 2 in the ceramics material/photonic crystal mode has an extremely small frequency range in which the propagation loss is small. Further, the waveguide element of Example of the present invention can be produced by a simple procedure and inexpensively because the formation of its periodic hole pattern does not require any semiconductor process.

The waveguide element according to the embodiment of the present invention may be used in a wide variety of fields including an optical waveguide, next-generation high-speed communication, a sensor, laser processing, and photovoltaic power generation, and may be suitably used particularly as a waveguide for waves ranging from a millimeter wave to a terahertz wave. Such waveguide element may be used as, for example, an antenna, a band-pass filter, a coupler, a delay line (phase shifter), or an isolator.

What is claimed is:

1. A waveguide element, comprising:

a dielectric portion having holes periodically formed in a substrate made of a ceramics material;

a low-dielectric constant portion having a dielectric constant smaller than a dielectric constant of the dielectric portion; and a support substrate arranged below the dielectric portion, the support substrate being configured to support the dielectric portion, wherein the waveguide element has a normalized frequency P/λ of from 0.05 to 0.3 where P represents a period of the holes and A represents a wavelength of the electromagnetic wave, wherein the waveguide element is configured to guide an electromagnetic wave having a frequency of 30 GHz or more and 20 THz or less, and wherein a frequency range of the electromagnetic wave in which an absolute value of a propagation loss becomes 1 dB/cm or less is 50 GHz or more.

2. The waveguide element according to claim 1, wherein the period P of the holes is 50 μm or more, and the period has a variation of P/100 or more.

3. The waveguide element according to claim 1, wherein the holes each have a respective diameter "d" of P/100 or more.

4. The waveguide element according to claim 1, further comprising a joining portion configured to integrate the dielectric portion and the support substrate with each other, wherein a lower surface of the dielectric portion, an upper surface of the support substrate, and the joining portion define a cavity, and wherein the cavity functions as the low-dielectric constant portion.

5. The waveguide element according to claim 1, wherein the ceramics material is polycrystalline or amorphous.

6. The waveguide element according to claim 5, wherein the ceramics material is selected from quartz glass, aluminum nitride, aluminum oxide, silicon carbide, magnesium oxide, and spinel.

7. The waveguide element according to claim 1, further comprising an active element capable of at least one of transmission, reception, or amplification of the electromagnetic wave, the active element being supported by the support substrate.

8. The waveguide element according to claim 7, further comprising:

a line-defect waveguide defined in a portion in the substrate where the holes are not formed; and a resonator defined in the portion in the substrate where the holes are free from being formed, the resonator being positioned between the active element and the line-defect waveguide in a propagation path of the electromagnetic wave, and being capable of guiding the electromagnetic wave.

9. The waveguide element according to claim 7, further comprising:

a line-defect first waveguide defined in a portion in the substrate where the holes are not formed; and a second waveguide positioned between the active element and the line-defect first waveguide in a propagation path of the electromagnetic wave, the second waveguide being capable of guiding the electromagnetic wave.

* * * * *